(12) United States Patent
Holden

(10) Patent No.: US 7,242,334 B2
(45) Date of Patent: Jul. 10, 2007

(54) WIRELESS RECEIVER CIRCUIT WITH MERGED ADC AND FILTER

(75) Inventor: Alan R. Holden, McKinney, TX (US)

(73) Assignee: SiRiFIC Wireless Corporation, Waterloo, Ontario (CA)

( * ) Notice: Subject to any disclaimer, the term of this patent is extended or adjusted under 35 U.S.C. 154(b) by 0 days.

(21) Appl. No.: 11/297,336

(22) Filed: Dec. 9, 2005

(65) Prior Publication Data

US 2007/0132623 A1    Jun. 14, 2007

(51) Int. Cl.
*H03M 1/00* (2006.01)
(52) U.S. Cl. .................. 341/139; 341/143; 341/155; 375/316; 455/307
(58) Field of Classification Search .............. 341/139, 341/143; 375/316
See application file for complete search history.

(56) References Cited

U.S. PATENT DOCUMENTS

| | | | | |
|---|---|---|---|---|
| 5,729,230 | A * | 3/1998 | Jensen et al. ............... | 341/143 |
| 5,940,452 | A | 8/1999 | Rich | |
| 6,005,506 | A * | 12/1999 | Bazarjani et al. ........... | 341/143 |
| 6,031,878 | A * | 2/2000 | Tomasz et al. ............. | 375/316 |
| 6,317,016 | B1 * | 11/2001 | Kuo ............................ | 333/215 |
| 6,670,901 | B2 * | 12/2003 | Brueske et al. ............. | 341/139 |
| 6,704,560 | B1 | 3/2004 | Balteanu et al. | |
| 6,876,844 | B1 | 4/2005 | Wong | |
| 6,980,785 | B1 | 12/2005 | Yang et al. | |
| 6,993,291 | B2 * | 1/2006 | Parssinen et al. ......... | 455/67.11 |
| 7,002,403 | B2 * | 2/2006 | Marholev .................... | 327/552 |
| 7,016,816 | B2 * | 3/2006 | Mott ........................... | 702/196 |
| 7,075,585 | B2 * | 7/2006 | Favrat et al. ............... | 348/554 |
| 7,098,730 | B1 * | 8/2006 | Shui ........................... | 327/553 |
| 7,139,544 | B2 * | 11/2006 | Smith et al. ................ | 455/307 |
| 2004/0180642 | A1 * | 9/2004 | Elmala et al. .............. | 455/306 |
| 2005/0195336 | A1 * | 9/2005 | Waight et al. .............. | 348/725 |
| 2006/0083335 | A1 * | 4/2006 | Seendripu et al. .......... | 375/332 |
| 2006/0126702 | A1 * | 6/2006 | Burdett ....................... | 375/136 |
| 2006/0164272 | A1 * | 7/2006 | Philips et al. ............... | 341/143 |

FOREIGN PATENT DOCUMENTS

| | | |
|---|---|---|
| KR | 20040049563 | 6/2004 |
| WO | 0227953 | 4/2002 |

* cited by examiner

*Primary Examiner*—Khai M. Nguyen
(74) *Attorney, Agent, or Firm*—Borden Ladner Gervais LLP

(57) ABSTRACT

A CMOS hybrid analog-digital receiver core where filtering and gain functions are implemented in the digital domain. The analog portion of the receiver core includes standard circuits such as a low noise amplifier for receiving an RF input signal, and a mixer circuit for down-converting the RF input signal to a base band frequency signal. The analog to digital conversion function is provided by a merged ADC filter circuit having a low order filter stage and an ADC stage. The low order filter stage performs low order filtering of the base band signal to reduce dynamic range and clock requirements for subsequent analog to digital conversion the ADC stage. The two circuit stages are considered to be merged since they both consist of an interconnection of identical transconductance cells, where each transconductance cell includes a series of interconnected CMOS inverters.

12 Claims, 7 Drawing Sheets

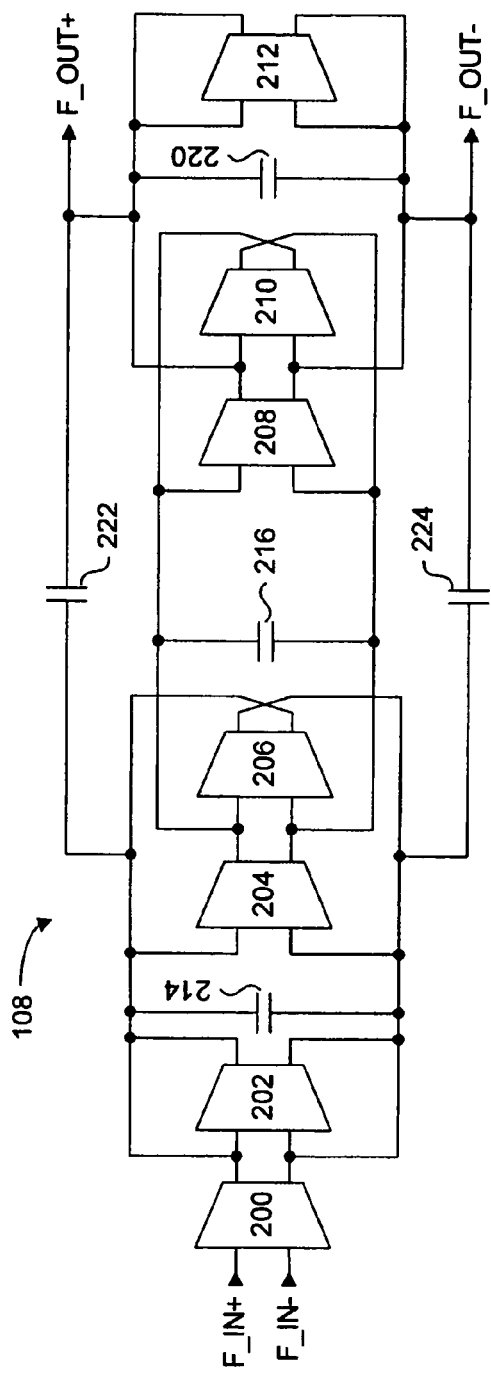
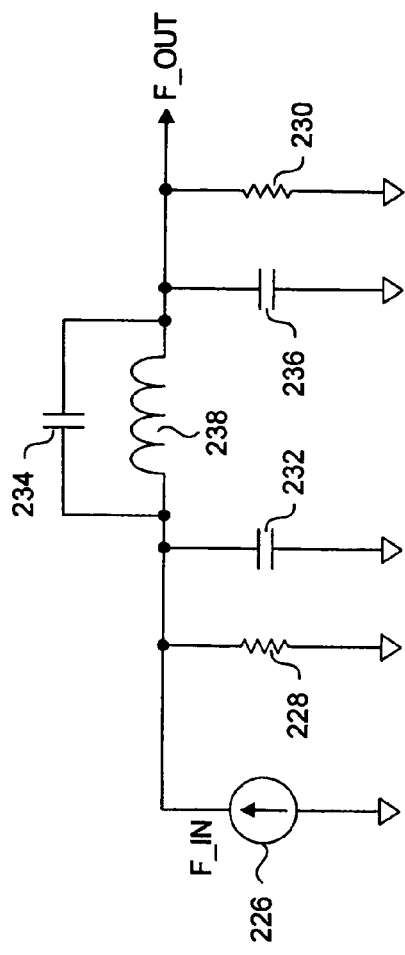
Figure 5a
Figure 5b

WIRELESS RECEIVER CIRCUIT WITH MERGED ADC AND FILTER

FIELD OF THE INVENTION

The present invention relates generally to wireless communications, and to analog to digital conversion of an RF signal. More specifically, the present invention relates to sigma delta analog to digital converters in the receiver path of a wireless device.

BACKGROUND OF THE INVENTION

Wireless devices have been in use for many years for enabling mobile communication of voice and data. Such devices can include mobile phones and wireless enabled personal digital assistants (PDA's) for example. FIG. 1 is a generic block diagram of the core components of such wireless devices. The wireless core 10 includes a base band processor 12 for controlling application specific functions of the wireless device and for providing and receiving voice or data signals to a radio frequency (RF) transceiver chip 14. The RF transceiver chip 14 is responsible for frequency up-conversion of transmission signals, and frequency down-conversion of received signals. RF transceiver chip 14 includes a receiver core 16 connected to an antenna 18 for receiving transmitted signals from a base station or another mobile device, and a transmitter core 20 for transmitting signals through the antenna 18. Those of skill in the art should understand that FIG. 1 is a simplified block diagram, and can include other functional blocks that may be necessary to enable proper operation or functionality.

Generally, the transmitter core 20 is responsible for up-converting electromagnetic signals from base band to higher frequencies for transmission, while receiver core 16 is responsible for down-converting those high frequencies back to their original frequency band when they reach the receiver, processes known as up-conversion and down-conversion (or modulation and demodulation) respectively. The original (or base band) signal, may be, for example, data, voice or video. These base band signals may be produced by transducers such as microphones or video cameras, be computer generated, or transferred from an electronic storage device. In general, the high frequencies provide longer range and higher capacity channels than base band signals, and because high frequency radio frequency (RF) signals can propagate through the air, they are preferably used for wireless transmissions as well as hard-wired or fibre channels.

All of these signals are generally referred to as radio frequency (RF) signals, which are electromagnetic signals; that is, waveforms with electrical and magnetic properties within the electromagnetic spectrum normally associated with radio wave propagation.

As shown in FIG. 2, the receiver core 16 can include a low noise amplifier 30, a mixer 32, a filter 34, a variable gain amplifier 36, and an analog to digital converter (ADC) 38. Filter 34 is typically a $6^{th}$ order filter consisting of a combination of transconductance cells, transconductance-capacitor filters, MOS-capacitor filters, RC filters, and op-amp circuits. ADC 38 can be implemented as either a discrete time or continuous time architecture. For example, ADC 38 can be implemented as a delta-sigma ADC with multi-level feedback digital to analog conversion. Additional circuits can preferably include dummy filter circuit 40 and dummy ADC circuit 42. Generally, dummy filter circuit 40 is a replica of filter circuit 34, or a replica of components of filter circuit 34, that will monitor an electrical parameter of filter 34 and tune it should the output value vary due to process and/or temperature variations. Similarly, dummy ADC circuit 42 is a replica of ADC 38, or a replica of components of ADC 38, and monitors an electrical parameter of ADC 38 for tuning purposes. Two separate dummy circuits are required because the architectures of the filter circuit 34 and the ADC 38 are distinct and different.

The function of the receiver core 16 is as follows. An RF input signal RFin is amplified by low noise amplifier 30, and then down-converted to baseband frequency z by mixer 32. This down-converted baseband signal is then filtered through filter 34 to reduce the dynamic range of the signal, and then amplified to a desired level of gain by variable gain amplifier 36 in response to the level of gain control voltage VCONT. The resulting output signal RFout is then converted to a digital signal D_SIGNAL by ADC 38. The digital signal D_SIGNAL can now be further processed in the digital domain by downstream circuits, such as base band processor 12.

This listing of components in receiver core 16 is not comprehensive, and any person of skill in the art will understand that the specific configuration will depend on the communication standard being adhered to and the chosen receiver architecture.

At the present time, all the aforementioned components of the receiver core 16 shown in FIG. 2 function in the analog domain, meaning that they are configured and operated for analog signal processing of the RF input signal RFin. Preferably, the quality of the signal received at ADC 38 should be maximized, in order to minimize potential data errors being transferred digitally to the baseband processor. The signal quality becomes more important as radio technology improves, hence it is important to ensure that the receiver components can execute their intended functions.

One receiver component that can affect signal quality is filter 34. Filter 34 being an analog circuit, suffers from typical analog circuit problems. For example, the circuit transfer functions can vary between identical circuits on the same chip, and can vary from chip to chip. The varying coefficients of the transfer function of filter 34 will adversely affect its characteristics, such as its phase and pass band shape, for example. Another limitation of filter 34 is that its design in the analog domain is limited to specific types of filters. Types of filters can include an FIR filter or an IIR filter, which are well known in the art. Accordingly, not all desired filters can be implemented or synthesized, for optimal signal processing.

From a manufacturing cost perspective, analog circuits do not scale well with each process generation. Digital circuits on the other hand are easily scalable. Therefore, mixed circuits will tend to be dominated in size by the analog circuits, unnecessarily increasing the area of the device. Ultimately, due to the limited capability of implementing optimal filter functions in the analog domain, signal quality can suffer.

In contrast, almost any type of filter can be synthesized in the digital domain. Thus, high signal quality can be obtained since compensation techniques and linear circuit behaviour can be achieved with digital circuits. Therefore, there is a trend to implement as much of the circuit components of FIG. 2 in the digital domain.

For the receiver path shown in FIG. 2, one desired configuration that maximizes the amount of digital domain circuitry is shown in FIG. 3. In this desired configuration, amplifier 30, mixer 32, ADC 38 and dummy ADC 40 remain in the analog domain. Filter 34, variable gain circuit 36, and dummy filter 42 of FIG. 2 have been ported to the digital domain 44 as digital filter 46, and digital gain circuit 48 respectively. The configuration shown in FIG. 3 represents an architecture that maximizes the amount of digital circuitry. Those of skill in the art will understand that such a receiver path configuration would be simpler to implement as there are less analog components than the receiver path shown in FIG. 2.

Unfortunately, the desired configuration of FIG. 3 is very difficult to achieve with presently known circuits and technology. Mainly, because there is no pre-filtering of the down-converted RF input signal before ADC 38, ADC 38 must then be able to accommodate the large dynamic range associated with the RFin signal. In particular, for single bit feedback configurations, delta-sigma ADC technology is more suitable for higher dynamic range signals. However, a major drawback of delta-sigma ADC's is that the clock used in the ADC 38 must be very clean, meaning that any minor clock jitter can contribute to increased sampling error. Increased sampling error will ultimately result in unreliable operation of the wireless device. Unfortunately, a suitable ADC circuit capable of reliable operation for large dynamic ranges is not yet available. Hence, for present mixed analog-digital receiver path designs, signal filtering is still required prior to ADC 38. However, a $6^{th}$ order analog filter, such as filter 34 in FIG. 2, consumes a relatively large amount of silicon area and has variations and limitations on its frequency response due to the previously discussed inherent limitations of an analog filter circuit implementation. Thus, signal quality is compromised.

The clock jitter problem has been addressed in the prior art by using a multi-level feedback DAC within the sigma-delta ADC. However, a significant problem with using multi-level feedback DAC is the added complexity and power consumption of the sigma-delta ADC.

Wireless devices are preferably low power to maximize battery life, and small to be packed into progressively shrinking form factor devices. Therefore, the current wireless core receiver path design shown in FIG. 2 is not suitable for future low power and minimally sized wireless devices. On the other hand, short-term foreseeable technology does not appear to be available to maximize the digital portion of a hybrid analog-digital receiver core. Accordingly, the all-analog receiver core shown in FIG. 2 remains the most reliable receiver core architecture available.

It is, therefore, desirable to provide a wireless receiver core architecture that will accommodate high dynamic range RF input signals while maximizing the amount of digital domain circuits to improve signal quality and to reduce receiver core power consumption.

SUMMARY OF THE INVENTION

It is an object of the present invention to obviate or mitigate at least one disadvantage of previous wireless signal receiver circuits. In particular, it is an object of the present invention to simplify delta-sigma analog to digital converter circuits for improving signal quality.

In a first aspect, the present invention provides a wireless device receiver for receiving an RF input signal. The receiver can include an input stage, an ADC circuit, and a digital processing circuit. The input stage converts the RF input signal to a baseband signal. The ADC circuit receives the baseband signal and generates a corresponding digital signal, where the ADC circuit executes low order filtering of the baseband signal prior to generating the corresponding digital signal. The wireless receiver can further include a digital processing circuit for executing high order filtering of the corresponding digital signal and for digitally applying a gain factor to the filtered digital signal. The input stage and the ADC circuit operate in an analog domain, while the digital processing circuit operates in a digital domain.

In a further embodiment, the input stage can include a low noise amplifier for receiving the RF input signal and generating an intermediate input signal having a predetermined amount of gain, and a mixer circuit for receiving the intermediate input signal and downconverting the intermediate input signal to a baseband frequency. The ADC circuit includes a low order filter stage for receiving the baseband signal, the low order filter reducing a dynamic range of the baseband signal to provide a filtered input signal, and an analog to digital converter stage for converting the filtered input signal into the corresponding digital signal. Preferably, the analog to digital converter stage includes a delta-sigma analog to digital converter having single bit feedback, and the low order filter stage is configured as a second order filter.

According to another embodiment of the present aspect the low order filter stage and the analog to digital converter stage are comprised of the same transconductance cells.

In a second aspect, the present invention provides a merged ADC filter circuit. The merged ADC filter circuit includes a low order filter stage and an analog to digital converter stage. The low order filter stage receives a baseband signal for reducing a dynamic range of the baseband signal to generate a filtered input signal. The analog to digital converter stage converts the filtered input signal into a corresponding digital signal.

In an embodiment of the present aspect, the low order filter stage and the analog to digital converter stage are configured with an interconnection of identical transconductance cells, where the analog to digital converter stage is preferably configured as a delta-sigma analog to digital converter core with single bit feedback. A monitoring circuit can be included for monitoring one transconductance cell and for tuning both the low order filter stage and the analog to digital converter stage in response thereto.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5a is a circuit schematic of a filter circuit implemented with transconductance cells according to an embodiment of the present invention;

FIG. 5b is an analog circuit representation of the circuit of FIG. 5a;

DETAILED DESCRIPTION

Generally, the present invention provides a CMOS hybrid analog-digital receiver core where filtering and gain functions are implemented in the digital domain. The analog portion of the receiver core includes standard circuits such as a low noise amplifier for receiving an RF input signal, and a mixer circuit for down-converting the RF input signal to a base band frequency signal. The analog to digital conversion function is provided by a merged ADC filter circuit having a low order filter stage and an ADC stage. The low order filter stage performs low order filtering of the base band signal to reduce dynamic range and clock requirements for subsequent analog to digital conversion the ADC stage. The two circuit stages are considered to be merged since they both consist of an interconnection of identical transconductance cells, where each transconductance cell includes a series of interconnected CMOS inverters. The resulting digital signal corresponding to the baseband signal can then be digitally filtered and amplified in the digital domain.

In particular, the following embodiments of the present invention are directed to a sigma delta continuous time ADC implemented with transconductance cell transfer functions.

Figure 2:
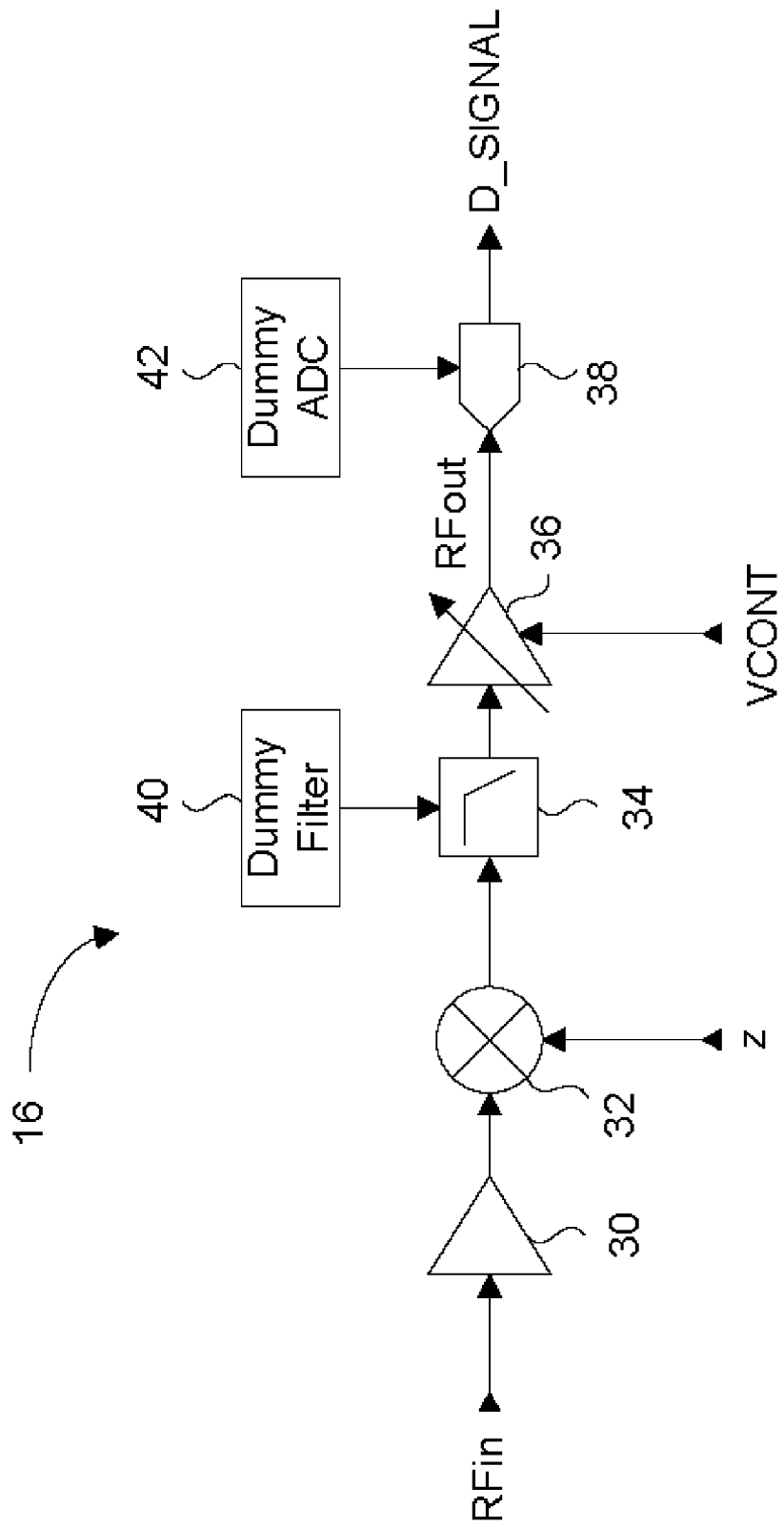
FIG. 2 is a circuit schematic of a prior art receiver core used in the wireless device core of FIG. 1.

According to an embodiment of the present invention, a merged analog to digital converter (ADC) with a low order filter stage is provided that will relax analog to digital conversion clock requirements. More specifically, the low order filter stage of the merged ADC reduces the dynamic range of the RF input signal prior to conversion. The merged analog to digital converter with low order filter is made possible by constructing or assembling both the filter stage and the analog to digital converter stage out of the same type of transconductance cell. Since both the stages are constructed of the same transconductance cell, they are therefore considered merged. In contrast, the separate filter 34 and ADC 38 of FIG. 2 are not considered merged, even if laid-out proximate to each other, since they each are constructed with different architectures. An embodiment of the present invention is shown in FIG. 4.

Figure 3:
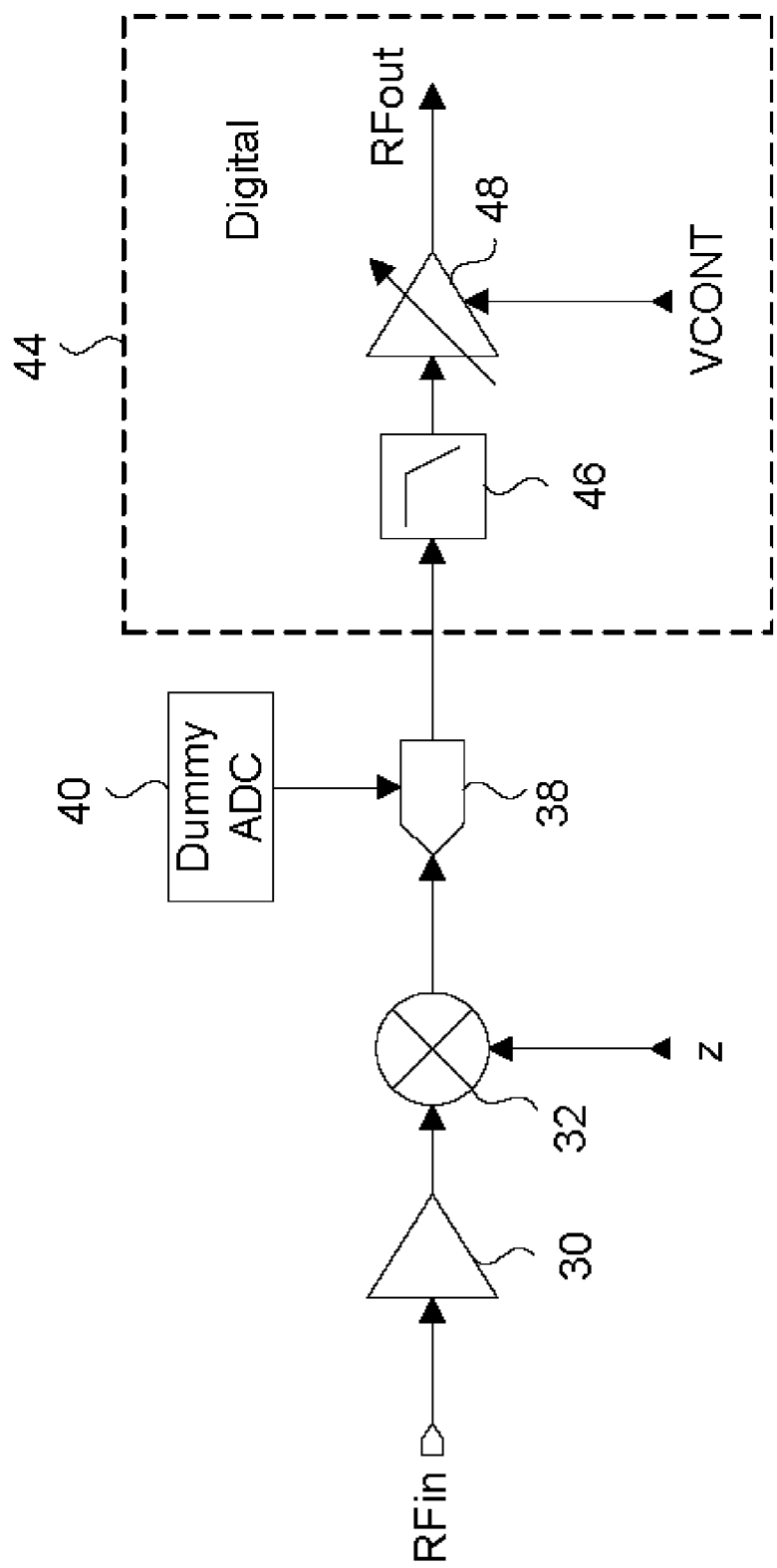
FIG. 3 is a circuit schematic of a hybrid analog-digital receiver core which can be used in the wireless device core of FIG. 1.
Figure 4:
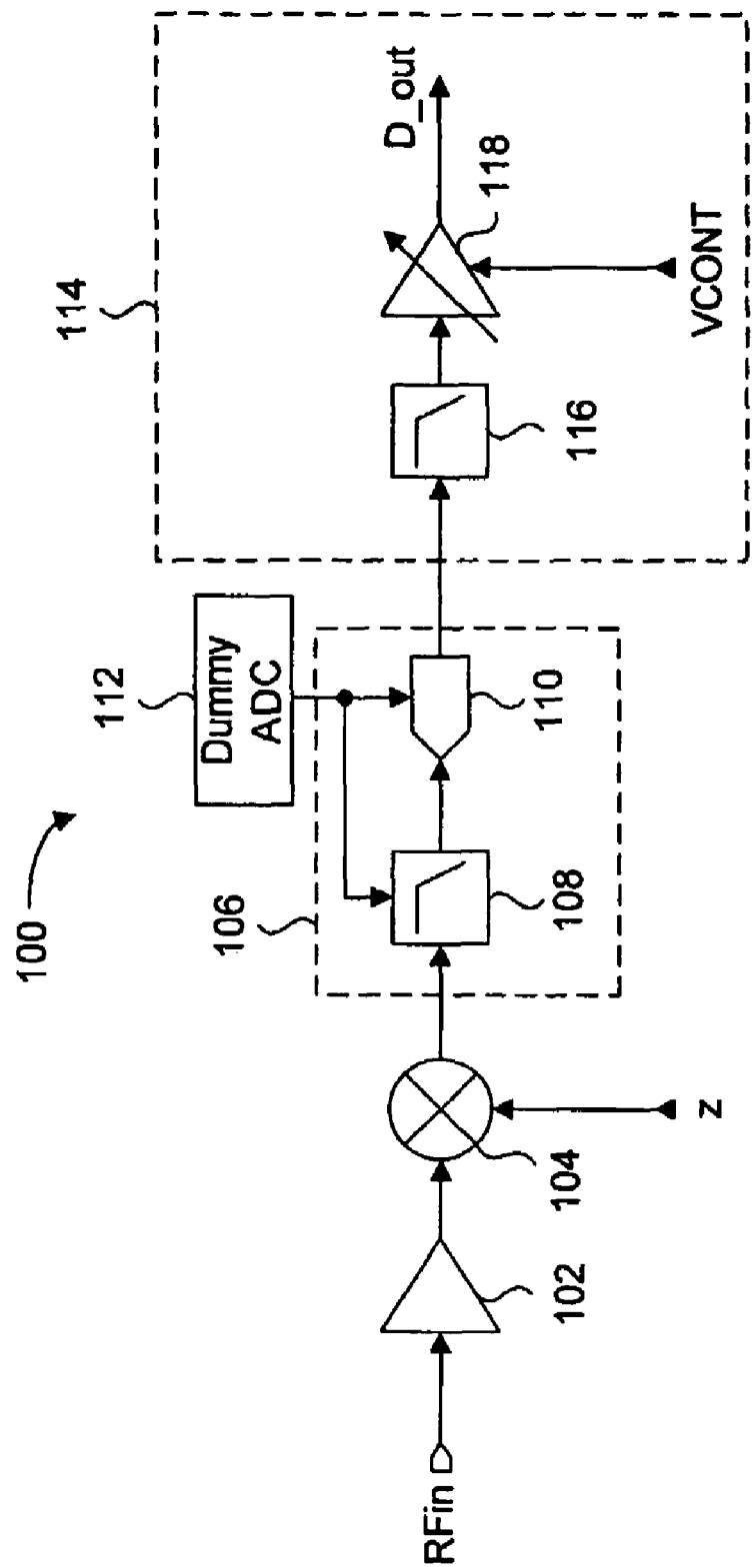
FIG. 4 is a circuit schematic of a receiver core according to an embodiment of the present invention.

The receiver core shown in FIG. 4 is similar to the circuit shown in both FIGS. 2 and 3. The hybrid analog-digital receiver 100 of FIG. 4 maximizes the amount of digital circuitry while ensuring reliable operation of the analog to digital converter. The analog portion of the mixed analog-digital receiver 100 includes an input stage for receiving and converting input signal RFin to a baseband signal, and a merged ADC circuit 106 for converting the baseband signal to a corresponding digital signal. The input stage and the merged ADC circuit operate in the analog domain. The corresponding digital signal is then further filtered and then amplified in the digital domain 114 by digital processing circuits.

The input stage includes a low noise amplifier 102 for receiving RFin and generating an intermediate input signal having a predetermined amount of gain, and an downconversion, or mixer circuit 104 for downconverting the intermediate input signal to a baseband frequency signal. Following the input stage is a merged ADC circuit 106. The merged ADC circuit 106 includes a low order filter stage 108 for filtering the baseband frequency to a dynamic range suitable for ADC stage 110. ADC stage 110 can be implemented as a delta-sigma ADC for example. ADC stage 110 generates a digital signal corresponding to the baseband frequency signal. An ADC dummy circuit 112 monitors a similar transconductance cell common to both filter stage 108 and ADC stage 110.

Low order filter stage 108 and ADC stage 110 are shown as separate components of merged ADC circuit 106, but according to an embodiment of the present invention, both these stages are merged together into a unitary circuit since they share the same architecture. Further details of merged ADC circuit 106 will be described later.

Figure 1:
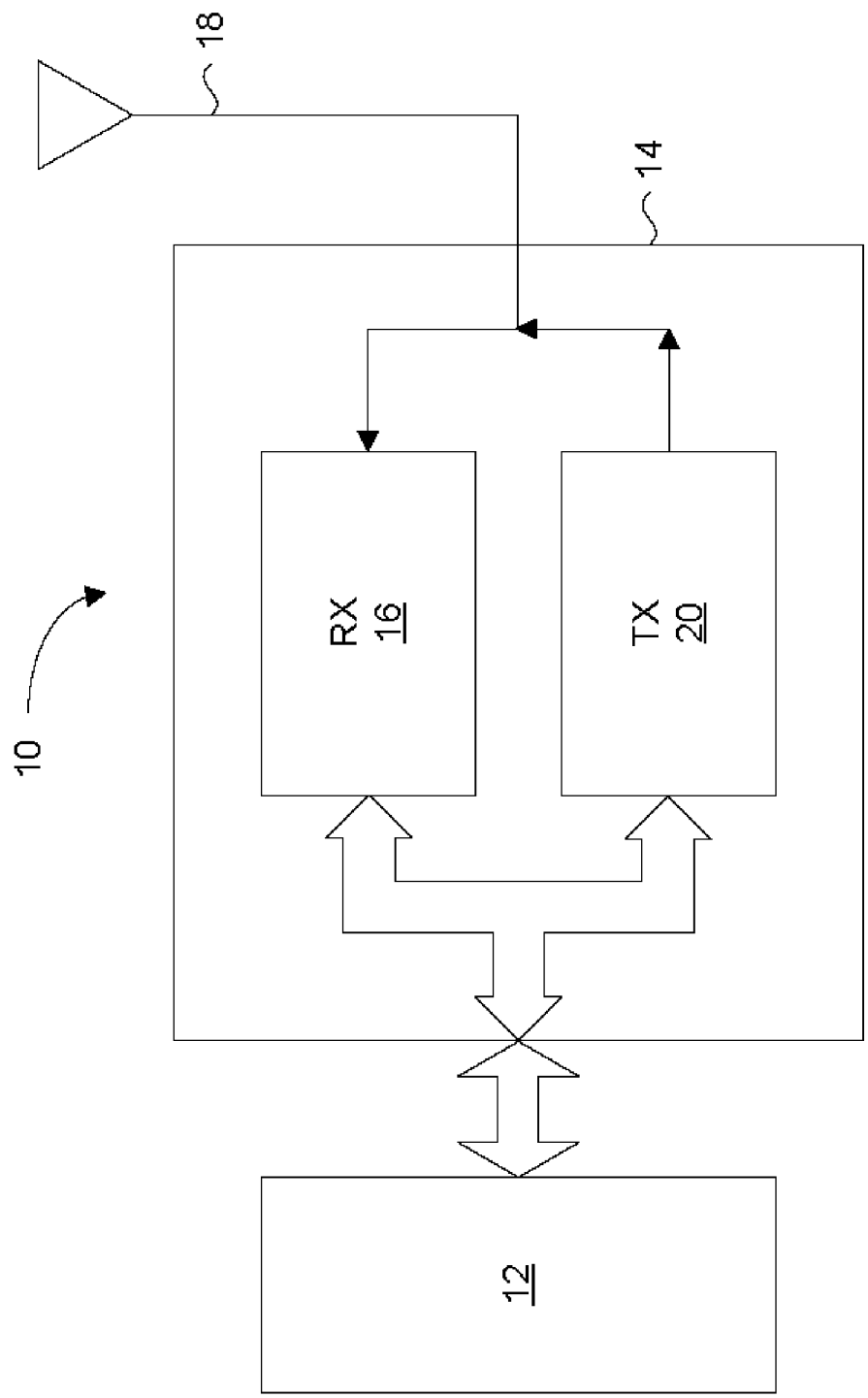
FIG. 1 is a block diagram of the core of a wireless device.

The digital processing circuits in the digital domain 114 of the mixed analog-digital receiver 100 include a high order filter 116 for further filtering the corresponding digital signal to a desired frequency range. This filtered digital signal is then amplified by variable gain circuit 118 by a desired amount corresponding to gain control signal VCONT. The amplified digital signal D_OUT is provided to other downstream circuits in the wireless device, such as the baseband processor 12 of FIG. 1 for example.

The presently shown hybrid analog-digital receiver 100 maximizes the amount of digital circuit content, while ensuring that the analog to digital conversion process can be executed reliably. This is achieved with the merged ADC circuit 106. Generally, the $6^{th}$ order filter 34 of FIG. 2 has been divided into two separate filters in the embodiment of FIG. 4. More specifically, the first filter 108 is preferably a second order analog domain filter while the second filter 116 is preferably a matched linear phase filter for the specific communication standard being adhered to. Those of skill in the art will understand that each standard has its own filter shape requirements. By including the second order filter 108, the dynamic range of the input signal is sufficiently reduced such that the clock requirements for ADC 110 are reduced. Accordingly, presently known ADC architectures, such as continuous time or discrete time architectures, can be reliably operated.

An additional advantage of using a second order filter instead of a $6^{th}$ order filter is the cost savings due to the significantly reduced size of the filter. For example, a second order filter circuit will occupy about 5-6 times less silicon area than a $6^{th}$ order filter circuit, hence reducing chip area and thus chip cost. This reduced amount of circuitry provides indirect benefits such as reduced power consumption, since the second order filter circuit will consume about 1 mA of current. In contrast, the $6^{th}$ order filter circuit will consume about 10 mA of current. Such power savings are significant and can extend the battery life of portable wireless devices.

Therefore, because low order filter 108 reduces the dynamic range of the input signal, ADC 110 which is preferably implemented as a delta-sigma ADC can be configured with a single bit feedback DAC. The single bit feedback DAC is significantly less complex than multi-level feedback delta-sigma ADC's, and the required clock tolerance is more relaxed. Those of skill in the art will understand that a clean, low error clock signal is difficult to synthesize, which further simplifies design of the system. Accordingly, not only is the design of the merged ADC circuit 106 simplified, high signal quality is obtained.

Figure 6:
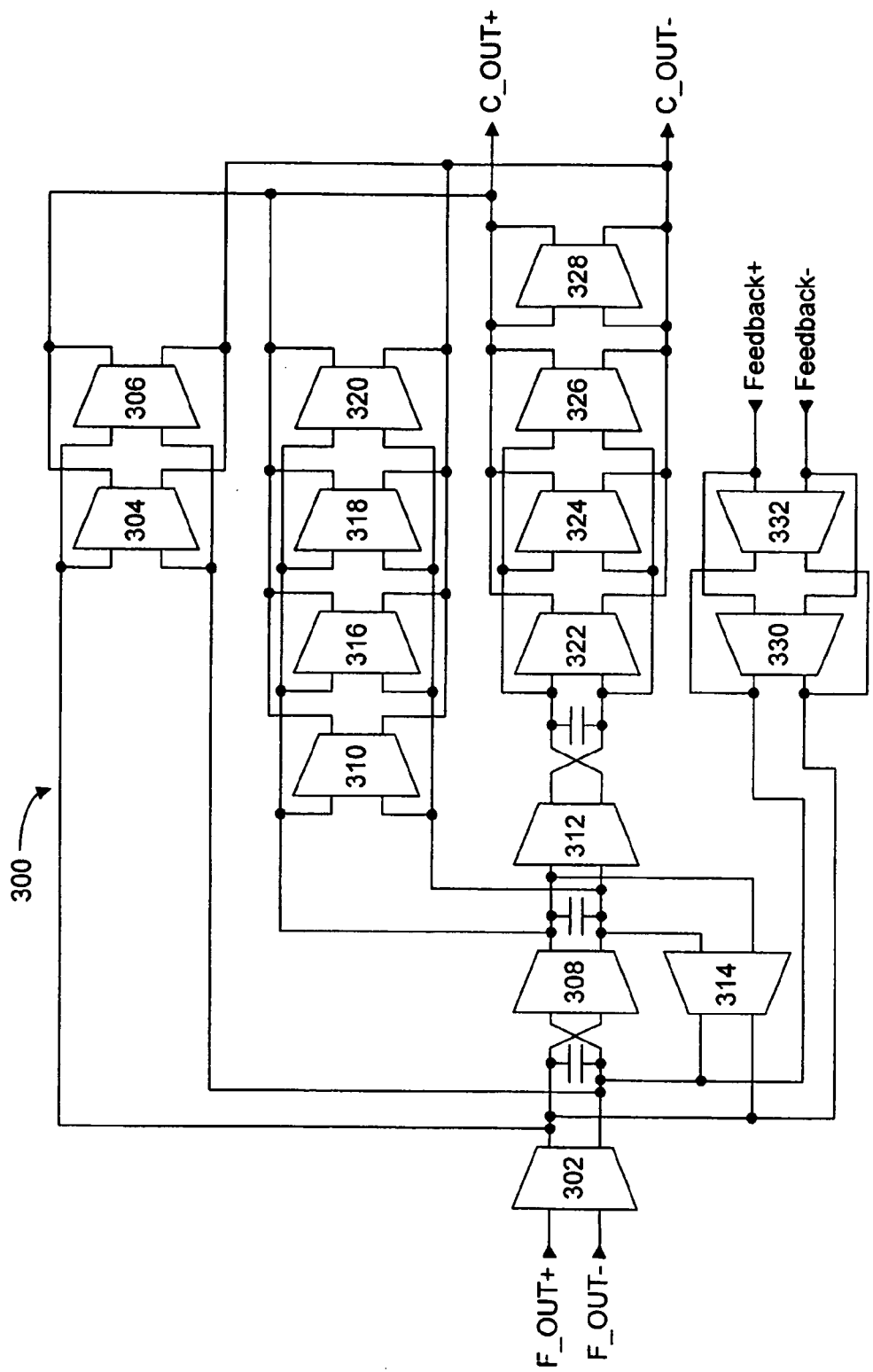
FIG. 6 is a circuit schematic of a delta-sigma ADC core according to an embodiment of the present invention.
Figure 7:
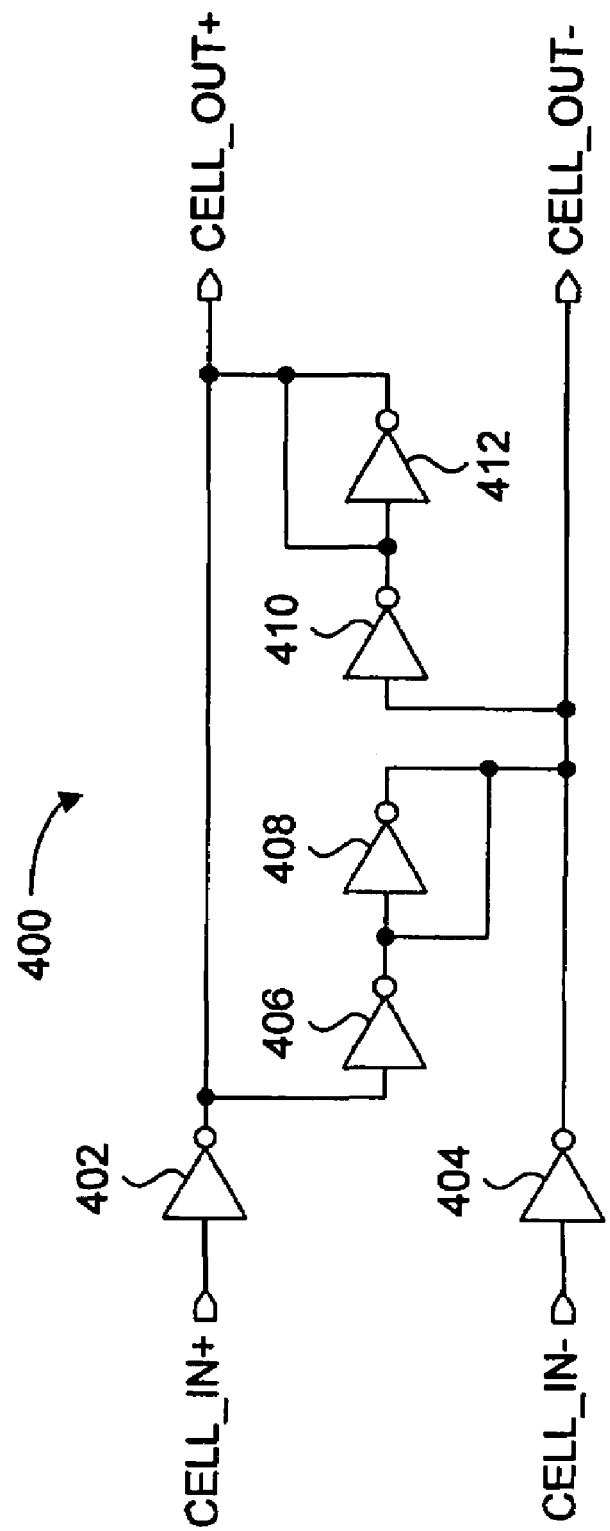
FIG. 7 is a circuit schematic of a transconductance cell used in the filter circuit of FIG. 5 and the delta-sigma ADC core of FIG. 6.

As previously mentioned, ADC circuit 106 consists of a filter stage and an ADC stage that are constructed of the same unit cell. FIGS. 5a, 5b and 6 illustrate examples of a filter stage circuit and an ADC stage circuit respectively, that are constructed as a series, or network, of CMOS transconductance cells. Those of skill in the art will understand that a transconductance cell generates a current corresponding to an input voltage. FIG. 7 illustrates one example of a CMOS transconductance cell that can be used.

As shown in FIG. 5a, the circuit of filter stage 108 is a connected network of identical transconductance cells 200, 202, 204, 206, 208, 210 and 212. Other components of filter stage 108 include passive capacitors 214, 216, 220, 222 and 224. The input of filter stage 108 is at cell 200, which receives differential signals F_IN+/F_IN− from mixer circuit 104 of FIG. 4. The outputs of cell 200 are coupled to the cross-coupled cells cells 204 and 206, which are further coupled to the first terminals of capacitors 222 and 224. The outputs of cell 204 are received by cross-coupled cells 208 and 210. The differential output signals F_OUT+/F_OUT− are provided from the outputs of cell 208 and coupled to the second terminals of capacitors 222 and 224.

Filter stage 108 is a low pass filter having the equivalent transfer function of the circuit shown in FIG. 5b. The circuit of FIG. 5b includes a well known arrangement of a current source 226, resistors 228, 230, capacitors 232, 234, 236, and inductor 238. Those of skill in the art will understand that more complex filter transfer functions can be implemented with the same transconductance cells by appropriately interconnecting additional transconductance cells. The circuit of FIG. 5a is a transconductance cell ladder implementation to obtain the transfer function of FIG. 5b.

FIG. 6 is a circuit schematic of the core of ADC stage 110. ADC stage 110 is preferably a fully functional delta-sigma analog to digital converter, but any suitable discrete or continuous time ADC circuit architecture can be used. Only the core of ADC stage 110 is shown in FIG. 6 to illustrate the embodiment of the present invention. Those of skill in the art will understand that the other circuits of the delta-sigma ADC are required for normal operation thereof, but will not be shown as they are not relevant to the presently illustrated embodiment of the invention. The core shown in FIG. 6 executes a well known modular delta-sigma transfer function without feedback, which is shown below in expression (1)

$$\frac{2s^2 + 4s + 3}{s^3 + 1}, \quad (1)$$

, where the coefficient "s" can be selected to be any integer number.

ADC core 300 includes fifteen interconnected transconductance cells that are identical to those in the filter stage 108 of FIG. 5. Cell 302 is the input cell for receiving differential output signals F_OUT+/F_OUT− from filter stage 108. The outputs of cell 302 are coupled to a first cell group consisting of cells 304 and 306 which are connected in parallel to each other, such that both cells 304 and 306 have common input terminals and common output terminals. The output terminals of cells 304 and 306 are connected to core output terminals C_OUT+/C_OUT−. The outputs of cell 302 are crossed and fed to cell 308, which then drives the inputs of cells 310, 312 and 314. The outputs of cell 314 are fed back to the inputs of cell 308. The outputs of cell 308 are also connected in parallel to a second cell group consisting of cells 310, 316, 318 and 320, who have their common outputs connected to core output terminals C_OUT+/C_OUT−. The outputs of cell 312 are connected in parallel to the inputs of a third cell group consisting of cells 322, 324 and 326. The common outputs of cells 322, 324 and 326 are connected to core output terminals C_OUT+/C_OUT−, while cell 328 has both its inputs and outputs connected to C_OUT+/C_OUT−. Cells 330 and 332 form part of a feedback path from other circuits of the delta-sigma ADC, and is not relevant to the embodiment of the present invention.

FIG. 7 is a circuit schematic of the transconductance cells shown in FIGS. 5 and 6. Transconductance cell 400 is composed of identical CMOS inverter elements, where each inverter is a complementary pair of transistors well known to those of skill in the art. Input inverter 402 is connected to receive input port CELL_IN+, and drives an output port CELL_OUT+. Input inverter 404 is connected to receive input port CELL_IN−, and drives an output port CELL_OUT−. Serially connected inverters 406 and 408 and serially connected inverters 410 and 412 are cross-coupled between output ports CELL_OUT+ and CELL_OUT−.

Because the components of filter stage 108 and ADC stage 110 are architecturally the same, meaning that they consist of the same transconductance cells, the two stages can be easily combined together into the merged ADC circuit 106. Since stages 108 and 110 are composed of the same transconductance cell, the cells of both stages can be laid-out to maximize silicon area use efficiency with minimal effort.

Another advantage is directly obtained by designing the filter stage 108 and the ADC stage 110 with the same architecture. Only one dummy ADC circuit 112 is required for tuning both circuits, which further reduces design overhead and obviates the need for a second dummy circuit for tuning a circuit implemented with a different architecture. Therefore, process variations can be corrected or compensated with a single dummy circuit, and not two different dummy circuits as in the prior art receiver path of FIG. 2.

Therefore, the presently described embodiment of the invention shown in FIG. 4 maximizes the digital content of the receiver path by implementing a high order filter and variable amplifier circuit in the digital domain. Presently available ADC circuits can be used in the hybrid analog-digital receiver core by including a merged ADC circuit having a low order filter stage to pre-filter the RF input signals to reduce or relax the dynamic range and clock requirements of the ADC stage, such as continuous time delta-sigma ADC circuits. In fact, since the low order filter and the ADC according to the embodiments of the present invention are formed of the same unitary circuit block, the low order filtering can be effectively merged with the ADC circuit, such that the ADC circuit is considered to include a low order pre-filtering function. The merged circuits minimizes the number of different dummy circuits required for tuning the operation of both the filter and ADC stage circuits.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A wireless device receiver for receiving an RF input signal comprising:
   an input stage for converting the RF input signal to a baseband signal; and,
   an analog to digital converter (ADC) circuit for receiving the baseband signal and generating a corresponding digital signal, the ADC circuit including
      a low order filter stage for receiving the baseband signal, the low order filter stage reducing a dynamic range of the baseband signal to provide a filtered input signal, and an analog to digital converter stage for converting the filtered input signal into the corresponding digital signal, the analog to digital converter stage and the low order filter stage including identical transconductance cells, each of the identical transconductance cells having an identical predetermined configuration of CMOS inverters.

2. The wireless device receiver of claim 1, further including a digital processing circuit for executing high order filtering of the corresponding digital signal and digitally applying a gain factor to the filtered digital signal.

3. The wireless device receiver of claim 1, wherein the input stage and the ADC circuit operate in an analog domain.

4. The wireless device receiver of claim 2, wherein the digital processing circuit operates in a digital domain.

5. The wireless device receiver of claim 1, wherein the input stage includes
- a low noise amplifier for receiving the RF input signal and generating an intermediate input signal having a predetermined amount of gain, and
- a mixer circuit for receiving the intermediate input signal and downconverting the intermediate input signal to a baseband frequency.

6. The wireless device receiver of claim 1, wherein the analog to digital converter stage includes a delta-sigma analog to digital converter having single bit feedback.

7. The wireless device receiver of claim 1, wherein the low order filter stage is configured as a second order filter.

8. The wireless device receiver of claim 1, further including a monitoring circuit for monitoring one transconductance cell and for tuning both the low order filter stage and the analog to digital converter stage.

9. A merged analog to digital converter (ADC) and filter circuit comprising:
- a low order filter stage for receiving a baseband signal, the low order filter reducing a dynamic range of the baseband signal to generate a filtered input signal; and
- an analog to digital converter stage for converting the filtered input signal into a corresponding digital signal, the analog to digital converter stage and the low order filter stage are configured with an interconnection of identical transconductance cells, each of the identical transconductance cells having an identical predetermined configuration of CMOS inverters.

10. The merged ADC filter circuit of claim 9, wherein the analog to digital converter stage includes a delta-sigma analog to digital converter core.

11. The merged ADC filter circuit of claim 10, wherein the delta-sigma analog to digital converter core is configured for single bit feedback.

12. The merged ADC filter circuit of claim 9, further including a monitoring circuit for monitoring one transconductance cell and for tuning both the low order filter stage and the analog to digital converter stage.

* * * * *